United States Patent
Kuang

(10) Patent No.: US 11,301,954 B2
(45) Date of Patent: Apr. 12, 2022

(54) METHOD FOR DETECTING COLLISION BETWEEN CYLINDRICAL COLLIDER AND CONVEX BODY IN REAL-TIME VIRTUAL SCENARIO, TERMINAL, AND STORAGE MEDIUM

(71) Applicant: Tencent Technology (Shenzhen) Company Limited, Shenzhen (CN)

(72) Inventor: Xini Kuang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/393,838

(22) Filed: Apr. 24, 2019

(65) Prior Publication Data
US 2019/0251657 A1    Aug. 15, 2019

Related U.S. Application Data

(63) Continuation of application No. 15/785,186, filed on Oct. 16, 2017, now Pat. No. 10,311,544, which is a
(Continued)

(30) Foreign Application Priority Data

Nov. 30, 2015    (CN) .......................... 201510864339.0

(51) Int. Cl.
*G06T 3/20* (2006.01)
*G06T 17/10* (2006.01)
(Continued)

(52) U.S. Cl.
CPC ................ *G06T 3/20* (2013.01); *G06F 30/00* (2020.01); *G06T 7/13* (2017.01); *G06T 7/246* (2017.01);
(Continued)

(58) Field of Classification Search
CPC ..................... G06T 13/20; G06T 13/80; G06T 2207/20164; G06T 2210/12;
(Continued)

(56) References Cited

U.S. PATENT DOCUMENTS 6,266,064 B1 * 7/2001 Snyder .................... G06T 15/06
345/421
6,407,748 B1    6/2002 Xavier
(Continued)

FOREIGN PATENT DOCUMENTS

CN    102194248 A    9/2011
CN    102368280 A    3/2012
(Continued)

OTHER PUBLICATIONS

Anders Backman, "Collision detection, what is the sound of one hand clapping?" Feb. 21, 2005, at http://www8.cs.umu.se/kurser/TDBD12/VT05/lectures/collision.pdf, Slides 1-41 (Year: 2005).*
(Continued)

*Primary Examiner* — Jin Cheng Wang
(74) *Attorney, Agent, or Firm* — Morgan, Lewis & Bockius LLP

(57) ABSTRACT

A method for detecting a collision between a cylindrical collider and a convex body in a real-time virtual scenario performed at a computer includes: determining a location of a cylindrical collider corresponding to a virtual object in a virtual scenario in a local coordinate system of a convex body; obtaining a projection of the cylindrical collider on one or more testing axes according to the location of the cylindrical collider in the local coordinate system of the convex body; when the projections of the cylindrical collider and the convex body intersect with each other on each testing axis, determining that there is a collision between the cylindrical collider and the convex body and moving the
(Continued)

cylindrical collider away from the convex body in the real-time virtual scenario to avoid the collision.

20 Claims, 7 Drawing Sheets

Related U.S. Application Data continuation-in-part of application No. PCT/CN2016/082930, filed on May 20, 2016.

(51) Int. Cl.
```
G06T 7/13       (2017.01)
G06T 7/246      (2017.01)
G06T 7/60       (2017.01)
G06T 7/70       (2017.01)
G06F 30/00      (2020.01)
G06T 13/20      (2011.01)
B25J 9/16       (2006.01)
G06F 30/20      (2020.01)
G06F 111/10     (2020.01)
G06T 13/80      (2011.01)
```

(52) U.S. Cl.
CPC ............... *G06T 7/60* (2013.01); *G06T 7/70* (2017.01); *G06T 17/10* (2013.01); *B25J 9/1666* (2013.01); *B25J 9/1676* (2013.01); *G06F 30/20* (2020.01); *G06F 2111/10* (2020.01); *G06T 13/20* (2013.01); *G06T 13/80* (2013.01); *G06T 2207/20164* (2013.01); *G06T 2210/12* (2013.01); *G06T 2210/21* (2013.01)

(58) Field of Classification Search
CPC ......... G06T 2210/21; G06T 3/20; G06T 7/13; G06T 7/246; G06T 7/60; G06T 7/70; G06T 17/10; G06F 2111/10; G06F 30/00; G06F 30/20; B25J 9/1666; B25J 9/1676
See application file for complete search history.

(56) References Cited

U.S. PATENT DOCUMENTS

| | | |
|---|---|---|
| 6,708,142 B1 | 3/2004 | Baillot et al. |
| 2002/0161562 A1 | 10/2002 | Strunk et al. |
| 2003/0164846 A1 | 9/2003 | Ottesen et al. |
| 2006/0149516 A1 | 7/2006 | Bond et al. |
| 2006/0262114 A1 | 11/2006 | Leprevost |
| 2011/0295576 A1 | 12/2011 | Miyata et al. |
| 2014/0025203 A1 | 1/2014 | Inazumi |

FOREIGN PATENT DOCUMENTS

| | | |
|---|---|---|
| CN | 103679271 A | 3/2014 |
| CN | 104156520 A | 11/2014 |
| CN | 105512377 A | 4/2016 |

OTHER PUBLICATIONS

Tomas Akenine-Moller, "Fast 3D Triangle-Box Overlap Testing", Jun. 2001, Department of Computer Engineering, Chalmers University of Technology, at https://fileadmin.cs.lth.se/cs/Personal/Tomas_Akenine-Moller/pubs/tribox.pdf, pp. 1-4 (Year: 2001).*

David Eberly, "Intersection of Convex Objects: The Method of separating Axes", at https://www.geometrictools.com/Documentation/MethodOfSeparatingAxes.pdf, Mar. 2, 2008, pp. 1-17 (Year: 2008).*

David Eberly, "Intersection of Cylinders", at https://www.geometrictools.com/Documentation/IntersectionOfCylinders.pdf, Nov. 21, 2000, pp. 1-13 (Year: 2000).*

Dirk Gregorius, "The Separating Axis Test between Convex Polyhedra", at http://twvideo01.ubm-us.net/o1/vault/gdc2013/slides/822403Gregorius_Dirk_TheSeparatingAxisTest.pdf; 2013, pp. 1-51 (Year: 2013).*

Lu Chen, et al., "Efficient Collision Determination for Dynamic Scenes using Coherent Separating Axis", Jan. 2007, International Journal of Virtual Reality, 2007, 6(3), pp. 17-22, at https://www.researchgate.net/publication/220222170 (Year: 2007).*

Johnny Huynh, "Separating Axis Theorem for Oriented Bounding Boxes", http://www.jkh.me/files/tutorials/SeparatingAxisTheoremforOrientedBoundingBoxes.pdf, Sep. 2009, pp. 1-45 (Year: 2009).*

J. H. Hooker, et al., "Enhancing Industrial Robotics Education with Open-source Software", 2017 ASEE Annual Conference & Exposition, Jun. 24, 2017, at https://peer.asee.org/28275, pp. 1-15 (Year: 2017).*

Tencent Technology, ISRWO, PCT/CN2016/082930, Aug. 24, 2016, 6 pgs.

Tencent Technology, IPRP, PCT/CN2016/082930, Jun. 5, 2018, 5 pgs.

* cited by examiner

METHOD FOR DETECTING COLLISION BETWEEN CYLINDRICAL COLLIDER AND CONVEX BODY IN REAL-TIME VIRTUAL SCENARIO, TERMINAL, AND STORAGE MEDIUM

CROSS-REFERENCE TO RELATED APPLICATIONS

This application is a continuation of U.S. application Ser. No. 15/785,186, entitled "METHOD FOR DETECTING COLLISION BETWEEN CYLINDRICAL COLLIDER AND CONVEX BODY IN REAL-TIME VIRTUAL SCENE, AND TERMINAL AND STORAGE MEDIUM" filed on Oct. 16, 2017, which is a continuation-in-part of PCT/CN2016/082930, entitled "METHOD FOR DETECTING COLLISION BETWEEN CYLINDRICAL COLLIDER AND CONVEX BODY IN REAL-TIME VIRTUAL SCENE, AND TERMINAL AND STORAGE MEDIUM" filed on May 20, 2016, which claims priority to Chinese Patent Application No. 201510864339.0, filed with the State Intellectual Property Office of the People's Republic of China on Nov. 30, 2015, and entitled "METHOD AND SYSTEM FOR DETECTING COLLISION BETWEEN CYLINDRICAL COLLIDER AND CONVEX BODY IN REAL-TIME VIRTUAL SCENARIO", all of which are incorporated herein by reference in their entirety.

FIELD OF THE TECHNOLOGY

The present disclosure relates to the field of computer application, and in particular, to a method for detecting a collision between a cylindrical collider and a convex body in a real-time virtual scenario, a terminal, and a non-volatile computer readable storage medium.

BACKGROUND OF THE DISCLOSURE

A virtual scenario is a scenario, such as a game scenario or an animation scenario, simulated by using a computer. Using a game scenario as an example, when a virtual object encounters an obstacle, the virtual object needs to get around the obstacle, that is, a collision between the virtual object and the obstacle. A conventional processing approach is simplifying both the virtual object and the obstacle as colliders of an Axis Aligned Bounding Box (AABB). As shown in FIG. 1, a collider 110 simplified from the virtual object needs to get around a corner 120 of a wall, and according to a motion change process shown in the figure, only after the collider 110 completely gets around the whole corner, the collider 110 can continue to move forward along a lower edge of the wall.

However, when such a collider 110 collides with or passes by a corner of a wall, operation of an operator is not smooth, the operator needs to control the collider to move the whole body, so as to get around the corner, and motion efficiency is low.

SUMMARY

Based on the above, it is necessary to provide a method for detecting a collision between a cylindrical collider and a convex body in a real-time virtual scenario, so as to improve smoothness of operation and improve moving efficiency.

In addition, it is also necessary to provide a terminal and a non-volatile computer readable storage medium, so as to improve smoothness of operation and improve moving efficiency.

A method for detecting a collision between a cylindrical collider and a convex body in a real-time virtual scenario performed at a computer having one or more processors and memory storing one or more programs to be executed by the one or more processors includes the following operations:

converting a cylindrical collider corresponding to a virtual object in a virtual scenario into a preset polygonal prism concentric to the cylindrical collider;

transforming the preset polygonal prism to a local coordinate system of a convex body, to obtain a location of the preset polygonal prism in the local coordinate system of the convex body;

obtaining, according to the location of the preset polygonal prism in the local coordinate system of the convex body, a normal direction of each face of the preset polygonal prism, an edge direction of a preset polygon, and an edge direction of a lateral edge of the prism;

obtaining a normal direction of each face and each edge direction of the convex body;

separately obtaining a vector product of each edge direction of the convex body and the edge direction of the preset polygon and a vector product of each edge direction of the convex body and the edge direction of the lateral edge of the prism;

using one or more of a normal direction of each face of the preset polygonal prism, a normal direction of each face of the convex body, and the vector products as one or more testing axes;

obtaining a projection of the cylindrical collider on the one or more testing axes according to each testing axis and the location of the preset polygonal prism in the local coordinate system of the convex body, and obtaining a projection of the convex body on each testing axis; and in accordance with a determination that the projections of the cylindrical collider and the convex body intersect with each other on each testing axis, determining that there is a collision between the cylindrical collider and the convex body and moving the cylindrical collider away from the convex body in the real-time virtual scenario to avoid the collision.

A computer, comprising one or more processors, memory and one or more programs stored in the memory that, when being executed by the one or more processors, cause the computer to perform a plurality of operations including:

converting a cylindrical collider corresponding to a virtual object in a virtual scenario into a preset polygonal prism concentric to the cylindrical collider;

transforming the preset polygonal prism to a local coordinate system of a convex body, to obtain a location of the preset polygonal prism in the local coordinate system of the convex body;

obtaining, according to the location of the preset polygonal prism in the local coordinate system of the convex body, a normal direction of each face of the preset polygonal prism, an edge direction of a preset polygon, and an edge direction of a lateral edge of the prism;

obtaining a normal direction of each face and each edge direction of the convex body;

separately obtaining a vector product of each edge direction of the convex body and the edge direction of the preset polygon and a vector product of each edge direction of the convex body and the edge direction of the lateral edge of the prism;

using one or more of a normal direction of each face of the preset polygonal prism, a normal direction of each face of the convex body, and the vector products as one or more testing axes;

obtaining a projection of the cylindrical collider on the one or more testing axes according to each testing axis and the location of the preset polygonal prism in the local coordinate system of the convex body, and obtaining a projection of the convex body on each testing axis; and in accordance with a determination that the projections of the cylindrical collider and the convex body intersect with each other on each testing axis, determining that there is a collision between the cylindrical collider and the convex body and moving the cylindrical collider away from the convex body in the real-time virtual scenario to avoid the collision.

A non-transitory computer readable storage medium storing one or more computer readable instructions that, when being executed by one or more processors of a computer, cause the computer to perform a plurality of operations including:

converting a cylindrical collider corresponding to a virtual object in a virtual scenario into a preset polygonal prism concentric to the cylindrical collider;

transforming the preset polygonal prism to a local coordinate system of a convex body, to obtain a location of the preset polygonal prism in the local coordinate system of the convex body;

obtaining, according to the location of the preset polygonal prism in the local coordinate system of the convex body, a normal direction of each face of the preset polygonal prism, an edge direction of a preset polygon, and an edge direction of a lateral edge of the prism;

obtaining a normal direction of each face and each edge direction of the convex body;

separately obtaining a vector product of each edge direction of the convex body and the edge direction of the preset polygon and a vector product of each edge direction of the convex body and the edge direction of the lateral edge of the prism;

using one or more of a normal direction of each face of the preset polygonal prism, a normal direction of each face of the convex body, and the vector products as one or more testing axes;

obtaining a projection of the cylindrical collider on the one or more testing axes according to each testing axis and the location of the preset polygonal prism in the local coordinate system of the convex body, and obtaining a projection of the convex body on each testing axis; and in accordance with a determination that the projections of the cylindrical collider and the convex body intersect with each other on each testing axis, determining that there is a collision between the cylindrical collider and the convex body and moving the cylindrical collider away from the convex body in the real-time virtual scenario to avoid the collision.

Details of one or more embodiments of the present disclosure are provided below in the accompanying drawings and descriptions. Other features, objectives, and advantages of the present disclosure become apparent with reference to the specification, the accompanying drawings, and the claims.

DESCRIPTION OF EMBODIMENTS

To make the objectives, technical solutions, and advantages of the present disclosure more comprehensible, the present disclosure is described below in further detail with reference to the accompanying drawings and embodiments. It should be understood that the specific embodiments described therein are merely used for explaining the present disclosure instead of limiting the present disclosure.

Figure 1:
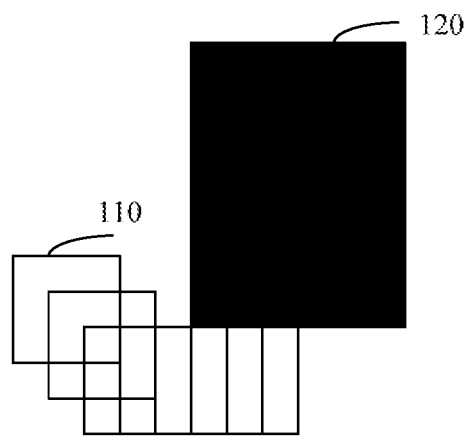
FIG. 1 is a schematic diagram of a process of a collision between colliders in a conventional real-time virtual scenario.
Figure 2:
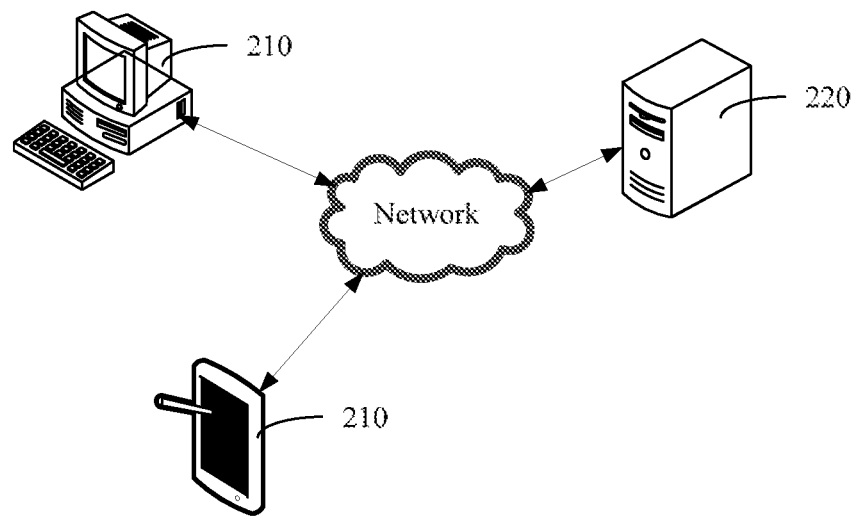
FIG. 2 is a schematic diagram of an application environment of a method and an apparatus for detecting a collision between a cylindrical collider and a convex body in a real-time virtual scenario in some embodiments.

FIG. 2 is a schematic diagram of an application environment of a method and an apparatus for detecting a collision between a cylindrical collider and a convex body in a real-time virtual scenario in some embodiments. As shown in FIG. 2, the application environment includes a terminal 210 and a server 220, and there may be a plurality of terminals 210. The plurality of terminals 210 communicate with the server 220. The method for detecting a collision between a cylindrical collider and a convex body in a real-time virtual scenario may run on the terminal 210, the terminal 210 obtains virtual scenario data from the server 220, and the terminal 210 obtains a convex body and a cylindrical collider corresponding to a virtual object in a virtual scenario and detects a collision between the convex body and the cylindrical collider. The real-time virtual scenario may be a real-time game scenario, a real-time animation scenario, or the like, and the virtual object may be a character or an object. The convex body may be a character or an object.

Figure 3A:
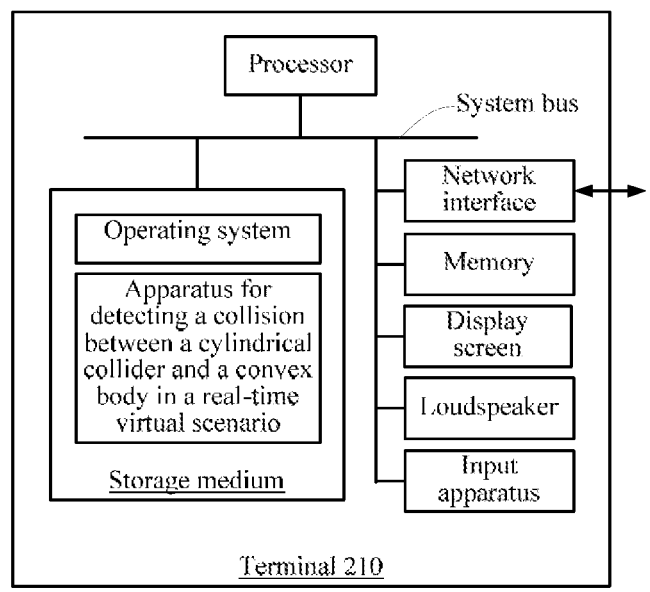
FIG. 3A is a schematic diagram of an internal structure of a terminal in some embodiments.

FIG. 3A is a schematic diagram of an internal structure of a terminal 210 in some embodiments. As shown in FIG. 3A, the terminal 210 includes a processor, a storage medium, a memory and a network interface, a sound collection apparatus, a display screen, a loudspeaker, and an input apparatus that are connected through a system bus. The storage medium of the terminal stores an operating system and further includes an apparatus for detecting a collision between a cylindrical collider and a convex body in a real-time virtual scenario, and the apparatus for detecting a collision between a cylindrical collider and a convex body in a real-time virtual scenario is configured to implement a method for detecting a collision between a cylindrical collider and a convex body in a real-time virtual scenario. The processor is configured to provide computing and control capabilities to support running of the whole terminal. The memory of the terminal provides an environment for running of the apparatus for detecting a collision between a cylindrical collider and a convex body in a real-time virtual scenario. The network interface is configured to perform network communication with a server, for example, send a data request to a server, receive corresponding data returned by the server, and so on. The display screen of the terminal may be a liquid crystal display screen or an electronic ink display screen. The input apparatus may be a touch layer covering the display screen, or a key, a trackball, or a trackpad disposed on a housing of the terminal, or an external keyboard, trackpad, mouse, or the like. The terminal may be a mobile phone, a desktop computer, a tablet computer, a personal digital assistant, or the like. A person skilled in the art may understand that the structure shown in FIG. 3A is merely a block diagram of a partial structure related to a solution of this application, and does not constitute a limitation to the terminal to which the solution of this application is applied, and specifically, the terminal may include more components or fewer components than those shown in the figure, or some components may be combined, or a different component deployment may be used.

Figure 3B:
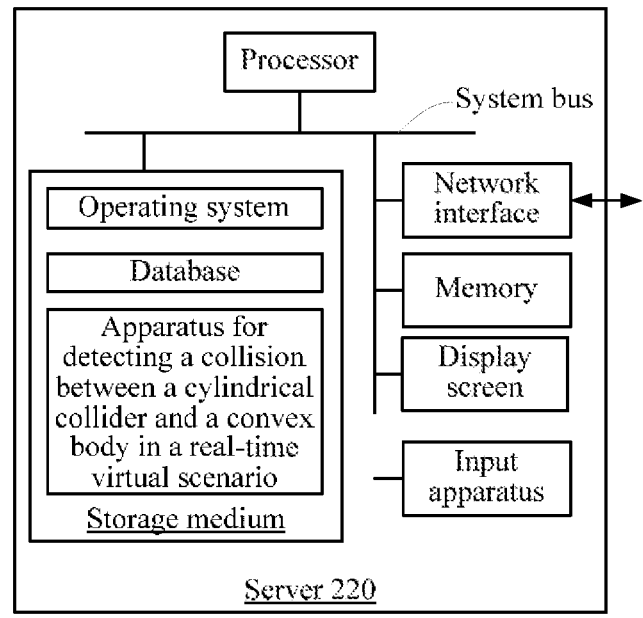
FIG. 3B is a schematic diagram of an internal structure of a server in some embodiments.

FIG. 3B is a schematic diagram of an internal structure of a server 220 in some embodiments. As shown in FIG. 3B, the server includes a processor, a storage medium, a memory, a network interface, a display screen, and an input apparatus that are connected through a system bus. The storage medium of the server stores an operating system, a database, and an apparatus for detecting a collision between a cylindrical collider and a convex body in a real-time virtual scenario, the database stores real-time virtual scenario data and the like, and the apparatus for detecting a collision between a cylindrical collider and a convex body in a real-time virtual scenario is configured to implement a method, applicable to the server, for detecting a collision between a cylindrical collider and a convex body in a real-time virtual scenario. The processor of the server is configured to provide computing and control capabilities to support running of the whole server. The memory of the server provides an environment for running of the apparatus for detecting a collision between a cylindrical collider and a convex body in a real-time virtual scenario in the storage medium. The display screen of the server may be a liquid crystal display screen or an electronic ink display screen. The input apparatus may be a touch layer covering the display screen, or a key, a trackball, or a trackpad disposed on a housing of a terminal, or an external keyboard, trackpad, mouse, or the like. The network interface of the server is configured to communicate with an external terminal by using a network connection, for example, receive a data interaction request sent by the server, return data to the terminal, and so on. The server may be implemented by using an independent server or a server cluster constituted by a plurality of servers. A person skilled in the art may understand that the structure shown in FIG. 3B is merely a block diagram of a partial structure related to a solution of this application, and does not constitute a limitation to the server to which the solution of this application is applied, and specifically, the server may include more components or fewer components than those shown in the figure, or some components may be combined, or a different component deployment may be used.

In another application environment, only a terminal 210 or a server 220 may be included. The method for detecting a collision between a cylindrical collider and a convex body in a real-time virtual scenario only needs to be run on the terminal or the server, for example, for motion of a virtual object in a game scenario or an animation scenario and the like. A user runs a downloaded console game on the terminal, or a tester tests a console game on the server, and so on.

To facilitate detecting a collision between colliders, in a real-time virtual scenario, a virtual character representing control of a player and other moving objects (such as a grenade or a camera) are all objects of an Actor class or a sub-class thereof, so that collision detection is performed in an axis aligned manner. To change a collider of a virtual character, the Actor class is modified, so that collision detection is performed by using a cylindrical collider as the virtual character and an AABB as a non-character Actor. In a real-time virtual scenario, there are mainly two types of scenario objects, including a BSP scenario object and a Component scenario object. Classified storage is performed according to different scenario objects. That is, objects are classified as the BSP or the Component. During collision detection, rough cutting is performed by using an entry function Uworld::MoveActor( ) of the collision detection according to scenario object classification to determine which objects of the class may collide with an incoming Actor object collider, and then, refined collision detection is performed and a result is returned. The rough cutting indicates performing a rough collision. A refined collision indicates implementing refined collision detection between a cylindrical collider and a convex body (that is, a Component scenario object) according to the method for detecting a collision between a cylindrical collider and a convex body in a real-time virtual scenario that is described below, and after the collision detection is finished, collision detection results are collected by using a series of Check functions into the Uworld::MoveActor( ) and further collection is performed by using Uworld::MoveActor( ) for further calculation such as a state change and damage calculation. In a Component scenario object, the AABB is replaced with a cylinder as a collider of the incoming MoveActor( ). The real-time virtual scenario may include a game scenario and an animation scenario, may be applied to a real-time game scenario, and is not limited thereto.

Figure 4:
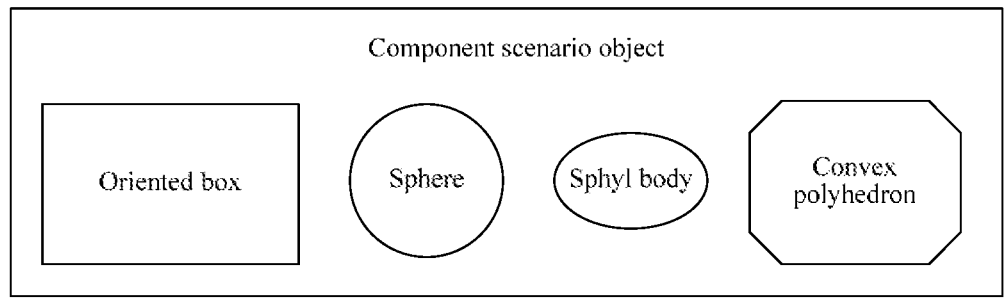
FIG. 4 is a schematic diagram of a scenario object included in a Component class.
Figure 5:
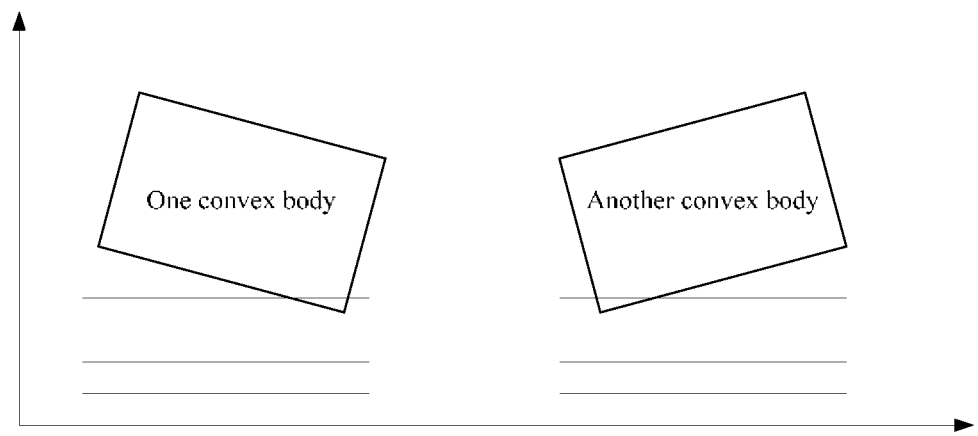
FIG. 5 is a schematic diagram in which projections of two convex bodies do not intersect with each other on a same axis.

Each Component scenario object includes several objects of an Element class, and the Element includes FKBoxElem, FKSphereElem, FKSphylElem, and FKConvexElem, which respectively present an oriented box, a sphere, a sphyl body, and a convex polyhedron, which, as shown in FIG. 4, are objects of the Element class included in the Component class. The Element indicates colliders, which are all convex bodies, among the Component objects. A status of collision detection between a cylindrical collider and a convex body is calculated by using a separating axis test algorithm. The theoretical basis of the separating axis test algorithm is that if two convex bodies do not intersect with each other, an axis, on which projections of the two convex bodies do not intersect with each other either, certainly can be found. As shown in FIG. 5, the projections of the two convex bodies are on the same axis and do not intersect with each other.

Figure 6:
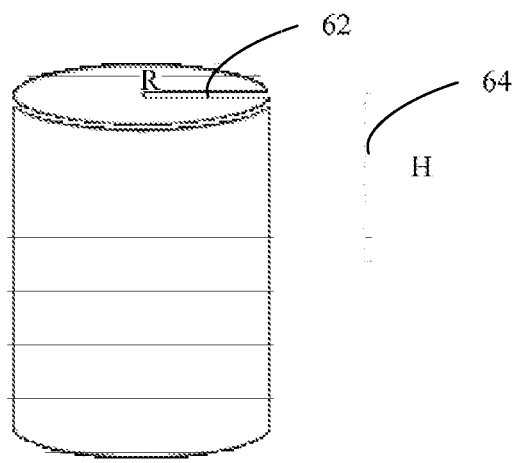
FIG. 6 is a schematic diagram of a cylindrical collider.

An Actor class is added to store a member variable of a cylindrical collider. In this case, it is assumed that a cylindrical collider of Actor is a vertical cylinder of the world coordinate system, and is represented by using a Cylinder class. FIG. 6 is a schematic diagram of a cylindrical collider in some embodiments. As shown in FIG. 6, a vertical cylinder is represented by using the Cylinder class, and in the Cylinder class, a horizontal line 62 is used to represent a radius, a vertical line 64 is used to represent a height, whose value is a half-height (that is a half of a height value of the cylindrical collider).

Figure 7:
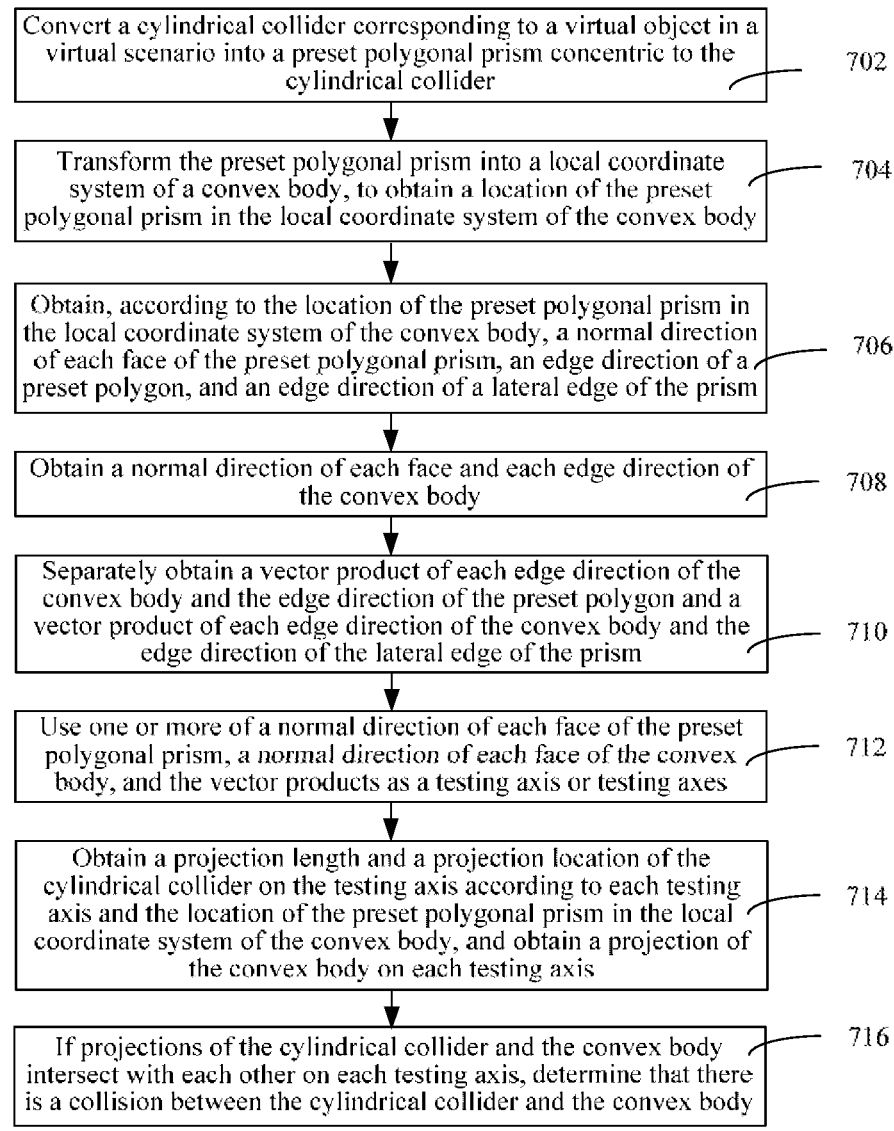
FIG. 7 is a flowchart of a method for detecting a collision between a cylindrical collider and a convex body in a real-time virtual scenario in some embodiments.

FIG. 7 is a flowchart of a method for detecting a collision between a cylindrical collider and a convex body in a real-time virtual scenario in some embodiments. As shown in FIG. 7, a method for detecting a collision between a cylindrical collider and a convex body in a real-time virtual scenario runs in an application environment in FIG. 2 and includes the following operations:

Operation 702: Convert a cylindrical collider corresponding to a virtual object in a virtual scenario into a preset polygonal prism concentric to the cylindrical collider.

Specifically, the virtual object may be a character or an object that can dynamically run in the real-time virtual scenario. The virtual object is configured as a cylindrical collider. A collider is an object, configured to calculate whether there is a collision between objects, that is, an object that actually participates in calculation of a collision algorithm.

The cylindrical collider is converted into a preset polygonal prism, and a central axis in a vertical direction of the preset polygonal prism is the same as that of the cylindrical collider. A center of the preset polygonal prism is the same as a midpoint of the cylindrical collider, and centers of upper and lower bottom faces of the preset polygonal prism are the same as those of upper and lower bottom faces of the cylindrical collider.

A preset polygon may be a regular polygon. A quantity of edges of a regular polygon may be 5, 6, 7, 8, 9, 16, 32, and the like, and is not limited thereto. When the quantity of edges of a regular polygon is an index of 2, for example, the regular polygon is an octagon, a hexadecagon, an icosidodecagon, a hexacontatetragon, or the like, processing of a computer is facilitated.

The real-time virtual scenario is a real-time game scenario, a real-time animation scenario, or the like. The real-time game scenario is a scenario of a running game. The real-time animation scenario is a scenario of a running animation. Collision detection is detecting whether a collision occurs between colliders. After a collision occurs, a collision response is generated, that is, after a collider collides with another collider, the collider cannot continue to move along an original moving direction, and a moving direction of a collider is adjusted to get around another collider, or a collider hits another collider to generate a hit response or the like. In this embodiment, collision detection mainly indicates that, to prevent a collider from colliding with another collider, a moving direction of a collider is adjusted to get around the another collider.

A size of a collider may be set according to a size of a virtual object in a virtual scenario. For example, if a virtual object is a sphere, a height of a cylindrical collider corresponding to the virtual object may be set to a diameter of the sphere, and a radius of the cylinder may be set to be slightly larger than a radius of the sphere.

Figure 8:
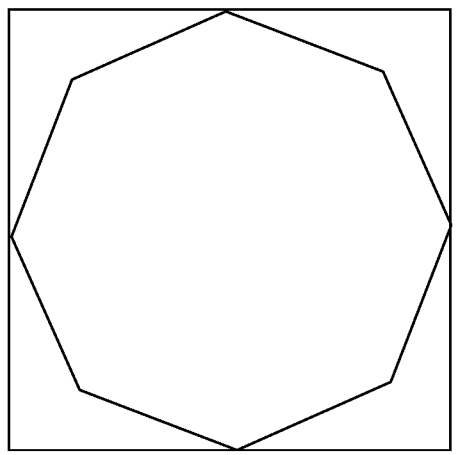
FIG. 8 is a top view of a regular octagonal prism.

FIG. 8 is a top view of a regular octagonal prism. FIG. 8 shows a top view of an octagonal prism after a cylinder of a cylindrical collider is converted into the octagonal prism. An external rectangle is an AABB of the cylindrical collider.

Operation 704: Transform the preset polygonal prism into a local coordinate system of a convex body, to obtain a location of the preset polygonal prism in the local coordinate system of the convex body.

In this embodiment, the cylinder is transformed into the local coordinate system of the convex body Element, which is actually transforming original three axes, namely, X, Y, and Z axes into the local coordinate system of the convex body while transforming a midpoint into the local coordinate system of the convex body, and further, reconstructing a location of the cylindrical collider in the local coordinate system of the convex body according to transformation results of the three axes, namely, X, Y, and Z axes, that is, transforming the preset polygonal prism into the local coordinate system of the convex body, to obtain a location of the preset polygonal prism in the local coordinate system of the convex body. If a preset polygonal prism being a hexadecagonal prism is used as an example, coordinates of 32 vertexes corresponding to the hexadecagonal prism is calculated according to three axes, namely, X, Y, and Z axes and a vector corresponding to a midpoint in the local coordinate system of the convex body, and 18 faces and 48 edges are constituted according to the 32 vertexes.

Coordinate system transformation is processed by using an ArbitraryAxisCylinder class, the ArbitraryAxisCylinder class adds a transformation matrix member variable configured to be transformed into a local coordinate system of the convex body Element, and vectors of original X-, Y-, and Z-axis unit vectors of the transformed cylindrical collider in the local coordinate system of the convex body are used for quickly determining whether transformation, such as rotation, translation, or expansion or contraction, has been performed on the cylindrical collider. In the ArbitraryAxisCylinder class, a radius, a height, new X, Y, and Z axes, and a displacement of the midpoint are recorded. How the cylindrical collider is transformed can be determined according to transformation results of the three axes, for accelerating projection calculation. The displacement of the midpoint may be used for calculating the location of the projection.

Figure 9:
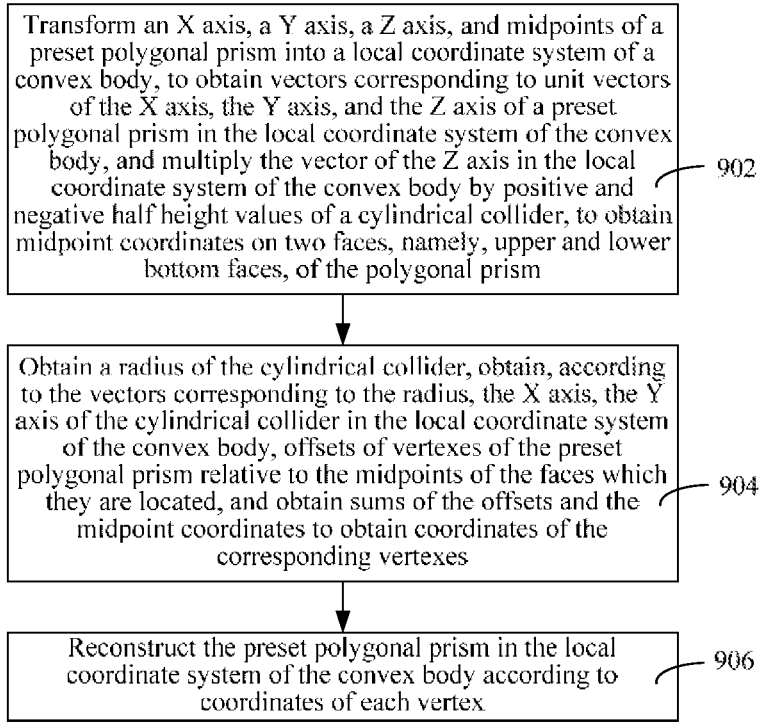
FIG. 9 is a specific flowchart of an operation of transforming the preset polygonal prism into a local coordinate system of a convex body, to obtain a location of the preset polygonal prism in the local coordinate system of the convex body in some embodiments.

FIG. 9 is a specific flowchart of an operation of transforming the preset polygonal prism into a local coordinate system of a convex body, to obtain a location of the preset polygonal prism in the local coordinate system of the convex body in some embodiments. As shown in FIG. 9, the transforming the preset polygonal prism into a local coordinate system of a convex body, to obtain a location of the preset polygonal prism in the local coordinate system of the convex body includes:

Operation 902: Transform an X axis, a Y axis, a Z axis, and midpoints of the preset polygonal prism into the local coordinate system of the convex body, to obtain vectors corresponding to unit vectors of the X axis, the Y axis, and the Z axis of the preset polygonal prism in the local coordinate system of the convex body, and multiply the vector of the Z axis in the local coordinate system of the convex body by positive and negative half height values of the cylindrical collider, to obtain midpoint coordinates on two faces, namely, upper and lower bottom faces, of the polygonal prism.

Specifically, the half-height of the cylindrical collider is represented by Height.

Operation 904: Obtain a radius of the cylindrical collider, obtain, according to the vectors corresponding to the radius, the X axis, the Y axis of the cylindrical collider in the local coordinate system of the convex body, offsets of vertexes of the preset polygonal prism relative to the midpoints of the faces which they are located, and obtain sums of the offsets and the midpoint coordinates to obtain coordinates of the corresponding vertexes.

Specifically, the radius of the cylindrical collider is represented by R. By means of the trigonometric function, the vectors of the radius R, the X axis, and the Y axis of the cylindrical collider in the local coordinate system of the convex body are multiplied by each other to obtain offsets of vertexes of hexadecagons on the upper and lower bottom faces of the hexadecagonal prism relative to the corresponding midpoint coordinates, that is, offsets of the 16 vertexes of the upper bottom face relative to the midpoint coordinates of the upper bottom face and offsets of the 16 vertexes of the lower bottom face relative to the midpoint coordinates of the lower bottom face. Corresponding vertex coordinates may be obtained by adding the offset to the corresponding midpoint coordinates.

Figure 10:
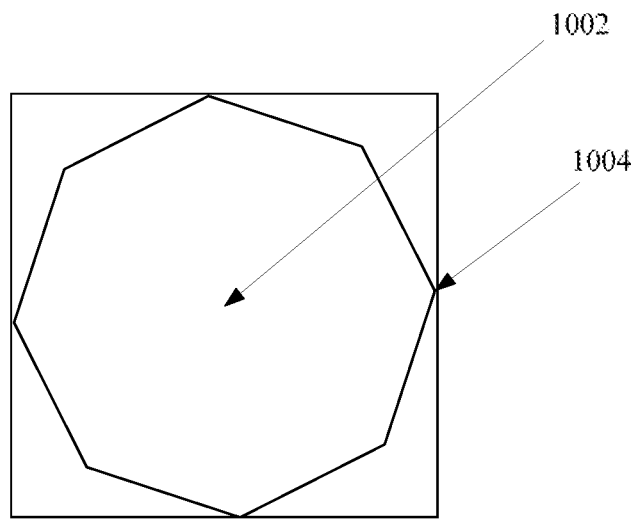
FIG. 10 is a schematic diagram of obtaining vertexes of an octagonal prism.

FIG. 10 is a schematic diagram of obtaining vertexes of an octagonal prism. As shown in FIG. 10, 1002 is a midpoint of a bottom face, and 1004 is one of vertexes of the bottom face.

Operation 906: Reconstruct the preset polygonal prism in the local coordinate system of the convex body according to coordinates of each vertex.

Specifically, after coordinates of each vertex are obtained, vertexes of an upper bottom face are connected in sequence to form the upper bottom, vertexes of a lower bottom face are connected in sequence to form the lower bottom, and corresponding vertexes in the upper bottom face and the lower bottom face are connected to each other to form a lateral edge of a prism. In this way, the 32 vertexes form 18 faces and 48 edges.

By transforming X, Y, and Z axes of a cylindrical collider into a local coordinate system of a convex body and transforming midpoints of the cylindrical collider into the local coordinate system of the convex body, a location of the preset polygonal prism converted from the cylindrical collider in the local coordinate system of the convex body is calculated according to vectors corresponding to the X, Y, and Z axes of the cylindrical collider in the local coordinate system of the convex body, midpoint coordinates, a radius and a half height of the cylindrical collider, and the like, so that the calculation is simple, a calculation amount is small, and performance is high.

It should be noted that if shear transformation is performed on the cylindrical collider, it is needed to, after all vertexes of the preset polygonal prism are calculated in the local coordinate system of the cylindrical collider, the vertexes are transformed into the local coordinate system of the convex body by using a matrix operation is performed. The sheer transformation indicate making a pattern generate a distortion Operation 706: Obtain, according to the location of the preset polygonal prism in the local coordinate system of the convex body, a normal direction of each face of the preset polygonal prism, an edge direction of a preset polygon, and an edge direction of a lateral edge of the prism.

Specifically, a normal direction of a face is a normal vector vertical to the face. Edge directions indicate extending directions of two ends of an edge, and the directions may be the same. A normal direction of a corresponding face is obtained by obtaining a vector product of the edge direction of the preset polygon and the edge direction of the lateral edge of the prism.

Figure 11:
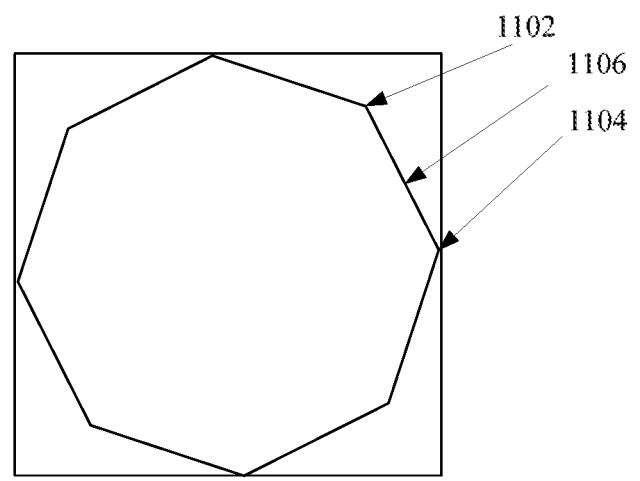
FIG. 11 is a schematic diagram of obtaining a normal direction of an octagonal prism.

FIG. 11 is a schematic diagram of obtaining a normal direction of an octagonal prism. As shown in FIG. 11, a corresponding edge 1106 may be calculated according to obtained coordinates of a vertex 1102 and a vertex 1104, further an edge direction of the edge 1106 is obtained, and the edge direction indicates that when two ends of the edge extend, a randomly extending direction is the edge direction of the edge.

Operation 708: Obtain a normal direction of each face and each edge direction of the convex body.

Specifically, the convex body may be an oriented box or a convex polyhedron. The oriented box is a cuboid, a cube, or the like. The convex polyhedron may be a polygonal prism or the like.

Operation 710: Separately obtain a vector product of each edge direction of the convex body and the edge direction of the preset polygon and a vector product of each edge direction of the convex body and the edge direction of the lateral edge of the prism.

Specifically, a vector product of each edge direction of the convex body and an edge direction of the preset polygon is separately obtained, and a vector product of each edge direction of the convex body and an edge direction of the later edge of the prism is separately obtained.

Operation 712: Use one or more of a normal direction of each face of the preset polygonal prism, a normal direction of each face of the convex body, and the vector products as one or more testing axes.

Specifically, the testing axes may include one or more of a normal direction of each face of the preset polygonal prism, a normal direction of each face of the convex body, a vector product of each edge direction of the convex body and an edge direction of the preset polygonal prism, and a vector product of each edge direction of the convex body and an edge direction of a lateral edge of the preset polygonal prism. That is, the testing axes may be selected from a normal direction of each face of the preset polygonal prism, a normal direction of each face of the convex body, a vector product of each edge direction of the convex body and an edge direction of the preset polygonal prism, a vector product of each edge direction of the convex body and an edge direction of a lateral edge of the preset polygonal prism, and several combinations thereof. If too few testing axes are selected, not intersection may be mistakenly identified as intersection, and if too many testing axes are selected, performance may be affected.

Operation 714: Obtain a projection of the cylindrical collider on the one or more testing axes according to each testing axis and the location of the preset polygonal prism in the local coordinate system of the convex body, and obtain a projection of the convex body on each testing axis.

In this embodiment, if after being transformed into the local coordinate system of the convex body, the preset polygonal prism that is converted from the cylindrical collider is not a cylindrical collider, each vertex of the preset polygonal prism in the local coordinate system of the convex body is projected, and extreme values are set to obtain a difference, so as to obtain a projection length of the cylindrical collider.

Specifically, using a hexadecagonal prism as an example, 32 vertexes of the hexadecagonal prism in the local coordinate system of the convex body are projected, extreme values are set to obtain a maximum extreme vertex and a minimum extreme vertex, an absolute value of a difference between the maximum extreme vertex and the minimum extreme vertex after projection is obtained as the projection length of the cylindrical collider.

If after being transformed into the local coordinate system of the convex body, the preset polygonal prism that is converted from the cylindrical collider is still a cylindrical collider, a radius and a half height of the cylindrical collider, coordinate base vectors corresponding to base vectors of three axes, namely, X, Y, and Z axes of the cylindrical collider transformed into the local coordinate system of the convex body, and a testing axis direction of the testing axis in the local coordinate system of the convex body are obtained to calculate the projection length of the cylindrical collider.

Specifically, if neither non-uniform scaling nor shear transformation has been performed on the cylindrical collider, that is, after being transformed, the cylindrical collider is still a cylindrical collider, the projection length is calculated by using the GetExtentOnAxisForRealCylinder( ) function.

In the FArbitraryAxisCylinder:GetExtentOnAxis( ) function, for a cylindrical collider that is still a cylinder after being transformed, the GetExtentOnAxis( ) calls GetExtentOnAxisForRealCylinder( ) to calculate the projection length. If M represents a matrix that transforms a cylinder from a local coordinate system of the cylinder to a local coordinate system of a convex body Element, $M^{-1}$ is a matrix that transforms the cylinder from the local coordinate system of the convex body Element to the local coordinate system of the cylinder. An incoming testing axis InAxis is in the local coordinate system of the convex body Element. Therefore, if $L=InAxis*M^{-1}$, L is a testing axis direction of the testing axis in the local coordinate system of the cylinder. CT is used to represent coordinate base vectors (including three members X, Y, and Z) after three base vectors of the cylindrical collider transformed into the local coordinate system of the convex body Element, and the algorithm is as formula (1):

$$\max(|CT.\vec{X}|,|CT.\vec{Y}|)\cdot R\cdot\sqrt{(L.x)^2+(L.y)^2}+|CT.\vec{Z}|\cdot H\cdot|L.z| \quad (1)$$

In formula (1), R represents a radius of the cylindrical collider, L.x represents an x component of L, L.y represents a y component of L, |L.z| represents an absolute value of a z component of L |L.z|, $|CT.\vec{X}|$ $|CT.\vec{X}|$ represents a length of an X base vector of CT, $|CT.\vec{Y}|$ represents a length of a Y base vector of CT, $|CT.\vec{Z}|$ represents a length of a Z base vector of CT, and H represents a half height (that is, a half of a height) of the cylindrical collider.

If after being transformed into the local coordinate system of the convex body, the preset polygonal prism that is converted from the cylindrical collider is still a cylindrical collider, the projection length of the cylindrical collider may be obtained by means of calculation in the following process: obtaining a larger value of a length of an X base vector an a length of a Y base vector of coordinate base vectors that are obtained by transforming three base vectors of the cylindrical collider into the local coordinate system of the convex body Element, further multiplying the larger value with the radius of the cylindrical collider, and further multiplying the product with square roots of the x component and the y component of the testing axis in the axis direction of the local coordinate system of the cylinder, to obtain a first product, multiplying a length of a Z base vector of the coordinate base vectors that are obtained by transforming the three base vectors of the cylindrical collider into the local coordinate system of the convex body Element with the half height of the cylindrical collider, further multiplying the product with an absolute value of the z component in the testing axis direction of the testing axis in the local coordinate system of the cylinder, to obtain a second product value, and obtaining a sum of the first product value and the second product value as the projection length of the cylindrical collider.

Further, if the testing axis is parallel to the vertical axis of the cylindrical collider, a product of a length of a Z base vector of the coordinate base vectors corresponding to the base vectors of three axes, namely, the X, Y, and Z axes, of the cylindrical collider that are transformed into the local coordinate system of the convex body and the half height is obtained as the projection length of the cylindrical collider.

Specifically, $|CT.\vec{Z}|\cdot H$ is used as the projection length of the cylindrical collider.

Further, if the testing axis is vertical to the vertical axis of the cylindrical collider, a larger value of a length of an X base vector and a length of a Y base vector of the coordinate base vectors corresponding to the base vectors of three axes, namely, the X, Y, and Z axes, of the cylindrical collider that are transformed into the local coordinate system of the convex body, and further, a product of the larger value and the radius of the cylindrical collider is used as the projection length of the cylindrical collider.

Specifically, $\max(|CT.\vec{X}|,|CT.\vec{Y}|)\cdot R$ is used as the projection length of the cylindrical collider. Theoretically, $|CT.\vec{X}|$ is equal to cylindrical $|CT.\vec{Y}|$, but a precision error of a matrix operation may exists in practical calculation. To ensure there is no false negative in a collision detection result, a larger value of the two is usually selected.

Operation 716: If projections of the cylindrical collider and the convex body intersect with each other on each testing axis, determine that there is a collision between the cylindrical collider and the convex body and move the cylindrical collider away from the convex body in the real-time virtual scenario to avoid the collision.

Specifically, in accordance with a determination that the projections of the cylindrical collider and the convex body intersect with each other on each testing axis, it is determined that there is a collision between the cylindrical collider and the convex body, and if there is a testing axis on which projections of the cylindrical collider and the convex body do not intersect with each other, it may be determined that there is no collision between the cylindrical collider and the convex body. Based on the determination result, one way or the other, the cylindrical collider is moved relative to the convex body in the real-time virtual scenario to avoid the collision if there is any.

In the foregoing method for detecting a collision between a cylindrical collider and a convex body in a real-time virtual scenario, in a real-time virtual scenario, collision detection is performed between a virtual object as a cylindrical collider and a convex body, the collision detection is performed to avoid a collision of the collider and replaces original collision detection performed between an AABB and a convex body. At the convex body, the cylindrical collider only needs to move by a relatively short distance. Because a moving distance is shortened, moving efficiency is improved, and smoothness of operation is also improved. By converting the cylindrical collider into a preset polygonal prism, a normal direction and an edge direction of a face of the cylindrical collider may be obtained, to facilitate selection of a testing axis. By means of proper selection of the testing axis, and an intersection status of projects of the cylindrical collider and the convex body on the testing axis, a collision status between the cylindrical collider and the convex body is determined, so that accuracy of determining is improved.

In an embodiment, the preset polygon is a regular polygon inscribed to a bottom face of the cylindrical collider.

Specifically, a quantity of edges of a regular polygon may be 5, 6, 7, 8, 9, 16, 32, and the like, and is not limited thereto. When the quantity of edges of a regular polygon is an index of 2, for example, the regular polygon is an octagon, a hexadecagon, an icosidodecagon, a hexacontatetragon, or the like, processing of a computer is facilitated. A regular polygon can simplify calculation and save calculation resources.

Further, if the polygon is a regular polygon having an even number of edges, when an edge direction of the preset polygon is obtained, edge directions that are asymmetrical based on a center are selected from a preset polygon of two preset polygons on upper and lower bottom faces of the reset polygonal prism, and a side direction of one lateral edge is selected when obtaining a side direction of a lateral edge of the prism.

For example, using a preset polygonal prism being a regular hexadecagonal prism as an example, lateral edges of the regular hexadecagonal prism are all parallel to each other, and it is only needed to select one lateral edge to obtain an edge direction of the lateral edge. The upper bottom face and the lower bottom face of the regular hexadecagonal prism are parallel to each other, so that it is only needed to select an edge direction of one bottom face. For each bottom face, the hexadecagon is also of central symmetry, so that it is only needed to obtain edge directions of eight edges.

Figure 12:
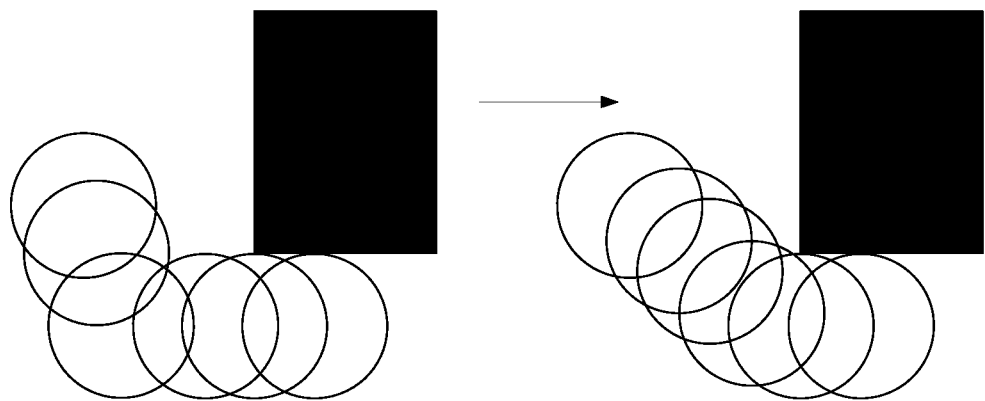
FIG. 12 is a schematic diagram of an effect and a theoretical result of using a conventional algorithm in collision detection using a cylindrical collider.

FIG. 12 is a schematic diagram of an effect and a theoretical result of using a conventional algorithm in collision detection using a cylindrical collider. As shown in FIG. 12, the left figure shows performing collision detection by using a cylindrical collider according to a conventional algorithm. It is also needed to move the whole cylindrical collider, so that the cylindrical collider can move along a bottom edge of a black collider, and the right figure shows a theoretical result that can be achieved by using the cylindrical collider after using the foregoing method for detecting a collision between colliders in a real-time virtual scenario. In a moving process of the cylindrical collider, a moving direction is relative short, moving efficiency is high, and operation is smooth.

An implementation process of the method for detecting a collision between colliders in a real-time virtual scenario is described below with reference to a specific application scenario. Using a real-time game scenario as an example, a cylindrical collider is a virtual character, a convex body is a wall body, and with reference to FIG. 12, a circle is a two-dimensional projection of the cylinder, and a block body is a two-dimensional projection of the convex body. The collision detection process includes:

(1) converting a cylindrical collider corresponding to a virtual object in a virtual scenario into a preset polygonal prism concentric to the cylindrical collider;

(2) transforming the preset polygonal prism to a local coordinate system of a convex body, to obtain a location of the preset polygonal prism in the local coordinate system of the convex body;

(3) obtaining, according to the location of the preset polygonal prism in the local coordinate system of the convex body, a normal direction of each face of the preset polygonal prism, an edge direction of a preset polygon, and an edge direction of a lateral edge of the prism;

(4) obtaining a normal direction of each face and each edge direction of the convex body;

(5) separately obtain a vector product of each edge direction of the convex body and the edge direction of the preset polygon and a vector product of each edge direction of the convex body and the edge direction of the lateral edge of the prism;

(6) using one or more of a normal direction of each face of the preset polygonal prism, a normal direction of each face of the convex body, and the vector products as one or more testing axes;

(7) obtaining a projection of the cylindrical collider on the one or more testing axes according to each testing axis and the location of the preset polygonal prism in the local coordinate system of the convex body, and obtaining a projection of the convex body on each testing axis; and (8) in accordance with a determination that the projections of the cylindrical collider and the convex body intersect with each other on each testing axis, determining that there is a collision between the cylindrical collider and the convex body and moving the cylindrical collider away from the convex body in the real-time virtual scenario to avoid the collision.

If collision detection is performed between the circle projected by the cylindrical collider and the convex body, a moving path of the cylindrical collider is obtained, as shown in FIG. 12.

Figure 13:
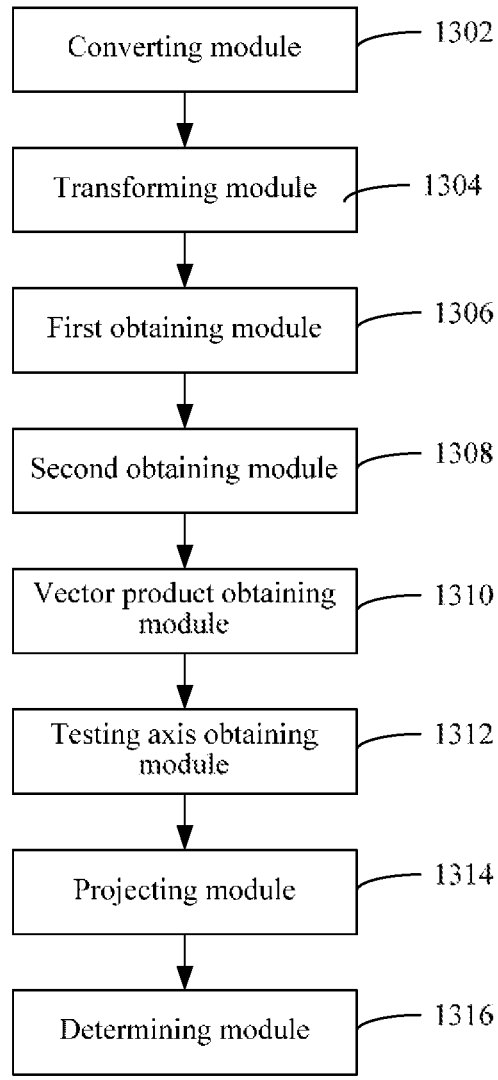
FIG. 13 is a structural block diagram of an apparatus for detecting a collision between a cylindrical collider and a convex body in a real-time virtual scenario in some embodiments.

FIG. 13 is a structural block diagram of an apparatus for detecting a collision between a cylindrical collider and a convex body in a real-time virtual scenario in some embodiments. As shown in FIG. 13, an apparatus for detecting a collision between a cylindrical collider and a convex body in a real-time virtual scenario includes a converting module 1302, a transforming module 1304, a first obtaining module 1306, a second obtaining module 1308, a vector product obtaining module 1310, a testing axis obtaining module 1312, a projecting module 1314, and a determining module.

The converting module 1302 is configured to convert a cylindrical collider corresponding to a virtual object in a virtual scenario into a preset polygonal prism concentric to the cylindrical collider.

Specifically, the virtual object may be a character or an object that can dynamically run in the real-time virtual scenario. The virtual object is configured as a cylindrical collider. A collider is an object, configured to calculate whether there is a collision between objects, that is, an object that actually participates in calculation of a collision algorithm.

The cylindrical collider is converted into a preset polygonal prism, and a central axis in a vertical direction of the preset polygonal prism is the same as that of the cylindrical collider. A center of the preset polygonal prism is the same as a midpoint of the cylindrical collider, and centers of upper and lower bottom faces of the preset polygonal prism are the same as those of upper and lower bottom faces of the cylindrical collider.

A preset polygon may be a regular polygon. A quantity of edges of a regular polygon may be 5, 6, 7, 8, 9, 16, 32, and the like, and is not limited thereto. When the quantity of edges of a regular polygon is an index of 2, for example, the regular polygon is an octagon, a hexadecagon, an icosidodecagon, a hexacontatetragon, or the like, processing of a computer is facilitated.

The transforming module 1304 is configured to transform the preset polygonal prism into a local coordinate system of a convex body, to obtain a location of the preset polygonal prism in the local coordinate system of the convex body.

In this embodiment, the cylinder is transformed into the local coordinate system of the convex body Element, which is actually transforming original three axes, namely, X, Y, and Z axes into the local coordinate system of the convex body while transforming a midpoint into the local coordinate system of the convex body, and further, reconstructing a location of the cylindrical collider in the local coordinate system of the convex body according to transformation results of the three axes, namely, X, Y, and Z axes, that is, transforming the preset polygonal prism into the local coordinate system of the convex body, to obtain a location of the preset polygonal prism in the local coordinate system of the convex body. If a preset polygonal prism being a hexadecagonal prism is used as an example, coordinates of 32 vertexes corresponding to the hexadecagonal prism is calculated according to three axes, namely, X, Y, and Z axes and a vector corresponding to a midpoint in the local coordinate system of the convex body, and 18 faces and 48 edges are constituted according to the 32 vertexes.

In this embodiment, the transforming module 1304 is further configured to transform an X axis, a Y axis, a Z axis, and midpoints of the preset polygonal prism into the local coordinate system of the convex body, to obtain vectors corresponding to unit vectors of the X axis, the Y axis, and the Z axis of the preset polygonal prism in the local coordinate system of the convex body, and multiply the vector of the Z axis in the local coordinate system of the convex body by positive and negative half height values of the cylindrical collider, to obtain midpoint coordinates on two faces, namely, upper and lower bottom faces, of the polygonal prism; obtain a radius of the cylindrical collider, obtain, according to the vectors corresponding to the radius, the X axis, the Y axis of the cylindrical collider in the local coordinate system of the convex body, offsets of vertexes of the preset polygonal prism relative to the midpoints of the faces which they are located, and obtain sums of the offsets and the midpoint coordinates to obtain coordinates of the corresponding vertexes; and reconstruct the preset polygonal prism in the local coordinate system of the convex body according to coordinates of each vertex.

Specifically, the radius of the cylindrical collider is represented by R. By means of the trigonometric function, the vectors of the radius R, the X axis, and the Y axis of the cylindrical collider in the local coordinate system of the convex body are multiplied by each other to obtain offsets of vertexes of hexadecagons on the upper and lower bottom faces of the hexadecagonal prism relative to the corresponding midpoint coordinates, that is, offsets of the 16 vertexes of the upper bottom face relative to the midpoint coordinates of the upper bottom face and offsets of the 16 vertexes of the lower bottom face relative to the midpoint coordinates of the lower bottom face. Corresponding vertex coordinates may be obtained by adding the offset to the corresponding midpoint coordinates. Specifically, after coordinates of each vertex are obtained, vertexes of an upper bottom face are connected in sequence to form the upper bottom, vertexes of a lower bottom face are connected in sequence to form the lower bottom, and corresponding vertexes in the upper bottom face and the lower bottom face are connected to each other to form a lateral edge of a prism. In this way, the 32 vertexes form 18 faces and 48 edges.

By transforming X, Y, and Z axes of a cylindrical collider into a local coordinate system of a convex body and transforming midpoints of the cylindrical collider into the local coordinate system of the convex body, a location of the preset polygonal prism converted from the cylindrical collider in the local coordinate system of the convex body is calculated according to vectors corresponding to the X, Y, and Z axes of the cylindrical collider in the local coordinate system of the convex body, midpoint coordinates, a radius and a half height of the cylindrical collider, and the like, so that the calculation is simple, a calculation amount is small, and performance is high.

The first obtaining module 1306 is configured to obtain, according to the location of the preset polygonal prism in the local coordinate system of the convex body, a normal direction of each face of the preset polygonal prism, an edge direction of a preset polygon, and an edge direction of a lateral edge of the prism.

Specifically, a normal direction of a face is a normal vector vertical to the face. Edge directions indicate extending directions of two ends of an edge, and the directions may be the same. A normal direction of a corresponding face is obtained by obtaining a vector product of the edge direction of the preset polygon and the edge direction of the lateral edge of the prism.

The second obtaining module 1308 is configured to obtain a normal direction of each face and each edge direction of the convex body.

Specifically, the convex body may be an oriented box or a convex polyhedron. The oriented box is a cuboid, a cube, or the like. The convex polyhedron may be a polygonal prism or the like.

The vector product obtaining module 1310 is configured to separately obtain a vector product of each edge direction of the convex body and the edge direction of the preset polygon and a vector product of each edge direction of the convex body and the edge direction of the lateral edge of the prism.

Specifically, a vector product of each edge direction of the convex body and an edge direction of the preset polygon is separately obtained, and a vector product of each edge direction of the convex body and an edge direction of the later edge of the prism is separately obtained.

The testing axis obtaining module 1312 is configured to use a normal direction of each face of the preset polygonal prism, a normal direction of each face of the convex body, and the vector products as testing axes.

Specifically, the testing axes may include one or more of a normal direction of each face of the preset polygonal prism, a normal direction of each face of the convex body, a vector product of each edge direction of the convex body and an edge direction of the preset polygonal prism, and a vector product of each edge direction of the convex body and an edge direction of a lateral edge of the preset polygonal prism.

The projecting module 1314 is configured to obtain a projection of the cylindrical collider on the one or more testing axes according to each testing axis and the location of the preset polygonal prism in the local coordinate system of the convex body, and obtain a projection of the convex body on each testing axis.

In this embodiment, the projecting module 1314 is further configured to, if after being transformed into the local coordinate system of the convex body, the preset polygonal prism that is converted from the cylindrical collider is not a cylindrical collider, project each vertex of the preset polygonal prism in the local coordinate system of the convex body, and set extreme values to obtain a difference, so as to obtain a projection length of the cylindrical collider.

Specifically, using a hexadecagonal prism as an example, 32 vertexes of the hexadecagonal prism in the local coordinate system of the convex body are projected, extreme values are set to obtain a maximum extreme vertex and a minimum extreme vertex, an absolute value of a difference between the maximum extreme vertex and the minimum extreme vertex after projection is obtained as the projection length of the cylindrical collider.

The projecting module 1413 is further configured to, if after being transformed into the local coordinate system of the convex body, the preset polygonal prism that is converted from the cylindrical collider is still a cylindrical collider, a radius and a half height of the cylindrical collider, obtain coordinate base vectors corresponding to base vectors of three axes, namely, X, Y, and Z axes of the cylindrical collider transformed into the local coordinate system of the convex body, and a testing axis direction of the testing axis in the local coordinate system of the convex body to calculate the projection length of the cylindrical collider.

Specifically, if neither non-uniform scaling nor shear transformation has been performed on the cylindrical collider, that is, after being transformed, the cylindrical collider is still a cylindrical collider, the projection length is calculated by using the GetExtentOnAxisForRealCylinder( ) function.

In the FArbitraryAxisCylinder:GetExtentOnAxis( ) function, for a cylindrical collider that is still a cylinder after being transformed, the GetExtentOnAxis( ) calls GetExtentOnAxisForRealCylinder( ) to calculate the projection length. If M represents a matrix that transforms a cylinder from a local coordinate system of the cylinder to a local coordinate system of a convex body Element, $M^{-1}$ is a matrix that transforms the cylinder from the local coordinate system of the convex body Element to the local coordinate system of the cylinder. An incoming testing axis InAxis is in the local coordinate system of the convex body Element. Therefore, if L=InAxis*$M^{-1}$, L is a testing axis direction of the testing axis in the local coordinate system of the cylinder. CT is used to represent coordinate base vectors (including three members X, Y, and Z) after three base vectors of the cylindrical collider transformed into the local coordinate system of the convex body Element, and the algorithm is as formula (1):

$$\max(|CT.\vec{X}|,|CT.\vec{Y}|) \cdot R \cdot \sqrt{(L.x)^2+(L.y)^2}+|CT.\vec{Z}| \cdot H \cdot |L.z| \quad (1)$$

In formula (1), R represents a radius of the cylindrical collider, L.x represents an x component of L, L.y represents a y component of L, |L.z| represents an absolute value of a z component of L |L.z|, $|CT.\vec{X}|$ $|CT.\vec{X}|$ represents a length of an X base vector of CT, $|CT.\vec{Y}|$ represents a length of a Y base vector of CT, represents a length of a Z base vector of CT, and H represents a half height (that is, a half of a height) of the cylindrical collider.

If after being transformed into the local coordinate system of the convex body, the preset polygonal prism that is converted from the cylindrical collider is still a cylindrical collider, the projection length of the cylindrical collider may be obtained by means of calculation in the following process: obtaining a larger value of a length of an X base vector an a length of a Y base vector of coordinate base vectors that are obtained by transforming three base vectors of the cylindrical collider into the local coordinate system of the convex body Element, further multiplying the larger value with the radius of the cylindrical collider, and further multiplying the product with square roots of the x component and the y component of the testing axis in the axis direction of the local coordinate system of the cylinder, to obtain a first product, multiplying a length of a Z base vector of the coordinate base vectors that are obtained by transforming the three base vectors of the cylindrical collider into the local coordinate system of the convex body Element with the half height of the cylindrical collider, further multiplying the product with an absolute value of the z component in the testing axis direction of the testing axis in the local coordinate system of the cylinder, to obtain a second product value, and obtaining a sum of the first product value and the second product value as the projection length of the cylindrical collider.

Further, if the testing axis is parallel to the vertical axis of the cylindrical collider, a product of a length of a Z base vector of the coordinate base vectors corresponding to the base vectors of three axes, namely, the X, Y, and Z axes, of the cylindrical collider that are transformed into the local coordinate system of the convex body and the half height is obtained as the projection length of the cylindrical collider.

Specifically, $|CT.\vec{Z}| \cdot H$ is used as the projection length of the cylindrical collider.

Further, if the testing axis is vertical to the vertical axis of the cylindrical collider, a larger value of a length of an X base vector and a length of a Y base vector of the coordinate base vectors corresponding to the base vectors of three axes, namely, the X, Y, and Z axes, of the cylindrical collider that are transformed into the local coordinate system of the convex body, and further, a product of the larger value and the radius of the cylindrical collider is used as the projection length of the cylindrical collider.

Specifically, $\max(|CT.\vec{X}|,|CT.\vec{Y}|) \cdot R$ is used as the projection length of the cylindrical collider. Theoretically, $|CT.\vec{X}|$ is equal to $|CT.\vec{Y}|$, but a precision error of a matrix operation may exists in practical calculation. To ensure there is no false negative in a collision detection result, a larger value of the two is usually selected.

The determining module 1316 is configured to, in accordance with a determination that the projections of the cylindrical collider and the convex body intersect with each other on each testing axis, determine that there is a collision between the cylindrical collider and the convex body.

Specifically, in accordance with a determination that the projections of the cylindrical collider and the convex body intersect with each other on each testing axis, it is determined that there is a collision between the cylindrical collider and the convex body, and if there is a testing axis on which projections of the cylindrical collider and the convex body do not intersect with each other, it may be determined that there is no collision between the cylindrical collider and the convex body.

In the foregoing apparatus for detecting a collision between a cylindrical collider and a convex body in a real-time virtual scenario, in a real-time virtual scenario, collision detection is performed between a virtual object as a cylindrical collider and a convex body, the collision detection is performed to avoid a collision of the collider and replaces original collision detection performed between an AABB and a convex body. At the convex body, the cylindrical collider only needs to move by a relatively short distance. Because a moving distance is shortened, moving efficiency is improved, and smoothness of operation is also improved. By converting the cylindrical collider into a preset polygonal prism, a normal direction and an edge direction of a face of the cylindrical collider may be obtained, to facilitate selection of a testing axis. By means of proper selection of the testing axis, and an intersection status of projects of the cylindrical collider and the convex body on the testing axis, a collision status between the cylindrical collider and the convex body is determined, so that accuracy of determining is improved.

In an embodiment, the preset polygon is a regular polygon inscribed to a bottom face of the cylindrical collider. If the polygon is a regular polygon having an even number of edges, when an edge direction of the preset polygon is obtained, edge directions that are asymmetrical based on a center are selected from a preset polygon of two preset polygons on upper and lower bottom faces of the reset polygonal prism, and a side direction of one lateral edge is selected when obtaining a side direction of a lateral edge of the prism.

For example, using a preset polygonal prism being a regular hexadecagonal prism as an example, lateral edges of the regular hexadecagonal prism are all parallel to each other, and it is only needed to select one lateral edge to obtain an edge direction of the lateral edge. The upper bottom face and the lower bottom face of the regular hexadecagonal prism are parallel to each other, so that it is only needed to select an edge direction of one bottom face. For each bottom face, the hexadecagon is also of central symmetry, so that it is only needed to obtain edge directions of eight edges.

A person of ordinary skill in the art may understand that, all or a part of the processes of the foregoing method embodiments may be implemented by a computer program instructing relevant hardware. The foregoing program may be stored in a non-volatile computer readable storage medium. When the program runs, the operations of the foregoing method embodiments are performed. The storage medium may be a magnetic disk, an optical disc, a read-only memory (ROM), or the like.

The embodiments above merely express several implementations of the present disclosure, and they are specifically described in detail, but should not be interpreted as limitations to the scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. A method for detecting a collision between a cylindrical collider and a convex body in a real-time virtual scenario performed at a computer having one or more processors and memory storing one or more programs to be executed by the one or more processors, the method comprising:
    determining a location of a cylindrical collider corresponding to a virtual object in a virtual scenario in a local coordinate system of a convex body;
    converting the cylindrical collider into a preset polygonal prism concentric to the cylindrical collider, wherein a central axis in a vertical direction of the preset polygonal prism coincides with a central axis of the cylindrical collider, a center of the preset polygonal prism coincides with a midpoint of the cylindrical collider, and centers of upper and lower bottom faces of the preset polygonal prism coincides with centers of upper and lower bottom faces of the cylindrical collider;
    transforming the preset polygonal prism to the local coordinate system of the convex body, to obtain a location of the preset polygonal prism in the local coordinate system of the convex body;
    obtaining a normal direction of each face and each edge direction of the convex body;
    calculating (i) a first vector product of each edge direction of the convex body and each edge direction of the preset polygonal prism and (ii) a second vector product of each edge direction of the convex body and each edge direction of a lateral edge of the preset polygonal prism;
    selecting one or more of the normal direction of each face of the preset polygonal prism, the normal direction of each face of the convex body, and the vector products as multiple testing axes;
    for each of the multiple testing axes,
        projecting the cylindrical collider onto the testing axis according to the location of the preset polygonal prism in the local coordinate system of the convex body;
    when the projections of the preset polygonal prism and the convex body intersect with each other on each testing axis:
        determining that there is a collision between the cylindrical collider and the convex body; and
        moving the cylindrical collider away from the convex body in the real-time virtual scenario to avoid the collision.

2. The method according to claim 1, wherein the preset polygonal prism is a substitute of the cylindrical collider.

3. The method according to claim 2, wherein the operation of determining a location of the preset polygonal prism in the local coordinate system of the convex body comprises:
    transforming an X axis, a Y axis, a Z axis, and midpoints of the preset polygonal prism into the local coordinate system of the convex body, to obtain vectors corresponding to unit vectors of the X axis, the Y axis, and the Z axis of the preset polygonal prism in the local coordinate system of the convex body;
    multiplying the vector of the Z axis in the local coordinate system of the convex body by positive and negative half height values of the cylindrical collider, to obtain midpoint coordinates on the upper and the lower bottom faces of the polygonal prism;
    obtaining a radius of the cylindrical collider, obtain, according to the vectors corresponding to the radius, the X axis, the Y axis of the cylindrical collider in the local coordinate system of the convex body, offsets of vertexes of the preset polygonal prism relative to the midpoints of the faces which they are located;
    obtaining sums of the offsets and the midpoint coordinates to obtain coordinates of the corresponding vertexes; and
    reconstructing the preset polygonal prism in the local coordinate system of the convex body according to coordinates of each vertex.

4. The method according to claim 2, further comprising:
    projecting each vertex of the preset polygonal prism in the local coordinate system of the convex body; and
    setting extreme values to obtain a difference, so as to obtain a projection length of the cylindrical collider.

5. The method according to claim 2, further comprising:
    obtaining a radius and a half height of the cylindrical collider, coordinate base vectors corresponding to base vectors of three axes, namely, X, Y, and Z axes of the cylindrical collider in the local coordinate system of the convex body, and a testing axis direction of each testing axis in the local coordinate system of the convex body to calculate a projection length of the cylindrical collider.

6. The method according to claim 1, wherein the preset polygon prism is a regular polygon inscribed to the bottom face of the cylindrical collider.

7. The method according to claim 6, wherein, the polygon is a regular polygon having an even number of edges, when an edge direction of the preset polygon is obtained, edge directions that are asymmetrical based on a center are selected from a preset polygon of two preset polygons on the upper and the lower bottom faces of the reset polygonal prism, and a side direction of one lateral edge is selected when obtaining a side direction of a lateral edge of the polygonal prism.

8. A computer, comprising one or more processors, memory and one or more programs stored in the memory that, when being executed by the one or more processors, cause the computer to perform a plurality of operations including:
   determining a location of a cylindrical collider corresponding to a virtual object in a virtual scenario in a local coordinate system of a convex body;
   converting the cylindrical collider into a preset polygonal prism concentric to the cylindrical collider, wherein a central axis in a vertical direction of the preset polygonal prism coincides with a central axis of the cylindrical collider, a center of the preset polygonal prism coincides with a midpoint of the cylindrical collider, and centers of upper and lower bottom faces of the preset polygonal prism coincides with centers of upper and lower bottom faces of the cylindrical collider;
   transforming the preset polygonal prism to the local coordinate system of the convex body, to obtain a location of the preset polygonal prism in the local coordinate system of the convex body;
   obtaining a normal direction of each face and each edge direction of the convex body;
   calculating (i) a first vector product of each edge direction of the convex body and each edge direction of the preset polygonal prism and (ii) a second vector product of each edge direction of the convex body and each edge direction of a lateral edge of the preset polygonal prism;
   selecting one or more of the normal direction of each face of the preset polygonal prism, the normal direction of each face of the convex body, and the vector products as multiple testing axes;
   for each of the multiple testing axes,
      projecting the cylindrical collider onto the testing axis according to the location of the preset polygonal prism in the local coordinate system of the convex body;
   when the projections of the preset polygonal prism and the convex body intersect with each other on each testing axis:
      determining that there is a collision between the cylindrical collider and the convex body; and
      moving the cylindrical collider away from the convex body in the real-time virtual scenario to avoid the collision.

9. The computer according to claim 8, wherein the preset polygonal prism is a substitute of the cylindrical collider.

10. The computer according to claim 9, wherein the operation of determining a location of the preset polygonal prism in the local coordinate system of the convex body further comprises:
   transforming an X axis, a Y axis, a Z axis, and midpoints of the preset polygonal prism into the local coordinate system of the convex body, to obtain vectors corresponding to unit vectors of the X axis, the Y axis, and the Z axis of the preset polygonal prism in the local coordinate system of the convex body;
   multiplying the vector of the Z axis in the local coordinate system of the convex body by positive and negative half height values of the cylindrical collider, to obtain midpoint coordinates on the upper and the lower bottom faces of the polygonal prism;
   obtaining a radius of the cylindrical collider, obtain, according to the vectors corresponding to the radius, the X axis, the Y axis of the cylindrical collider in the local coordinate system of the convex body, offsets of vertexes of the preset polygonal prism relative to the midpoints of the faces which they are located;
   obtaining sums of the offsets and the midpoint coordinates to obtain coordinates of the corresponding vertexes; and
   reconstructing the preset polygonal prism in the local coordinate system of the convex body according to coordinates of each vertex.

11. The computer according to claim 9, wherein the plurality of operations further comprise:
   projecting each vertex of the preset polygonal prism in the local coordinate system of the convex body; and
   setting extreme values to obtain a difference, so as to obtain a projection length of the cylindrical collider.

12. The computer according to claim 9, wherein the plurality of operations further comprise:
   obtaining a radius and a half height of the cylindrical collider, coordinate base vectors corresponding to base vectors of three axes, namely, X, Y, and Z axes of the cylindrical collider in the local coordinate system of the convex body, and a testing axis direction of each testing axis in the local coordinate system of the convex body to calculate a projection length of the cylindrical collider.

13. The computer according to claim 8, wherein the preset polygon prism is a regular polygon inscribed to the bottom face of the cylindrical collider.

14. The computer according to claim 13, wherein, the polygon is a regular polygon having an even number of edges, when an edge direction of the preset polygon is obtained, edge directions that are asymmetrical based on a center are selected from a preset polygon of two preset polygons on the upper and the lower bottom faces of the reset polygonal prism, and a side direction of one lateral edge is selected when obtaining a side direction of a lateral edge of the polygonal prism.

15. A non-transitory computer readable storage medium storing one or more computer readable instructions that, when being executed by a computer having one or more processors, cause the computer to perform a plurality of operations including:
   determining a location of a cylindrical collider corresponding to a virtual object in a virtual scenario in a local coordinate system of a convex body;
   converting the cylindrical collider into a preset polygonal prism concentric to the cylindrical collider, wherein a central axis in a vertical direction of the preset polygonal prism coincides with a central axis of the cylindrical collider, a center of the preset polygonal prism coincides with a midpoint of the cylindrical collider, and centers of upper and lower bottom faces of the preset polygonal prism coincides with centers of upper and lower bottom faces of the cylindrical collider;
   transforming the preset polygonal prism to the local coordinate system of the convex body, to obtain a location of the preset polygonal prism in the local coordinate system of the convex body;

obtaining a normal direction of each face and each edge direction of the convex body;

calculating (i) a first vector product of each edge direction of the convex body and each edge direction of the preset polygonal prism and (ii) a second vector product of each edge direction of the convex body and each edge direction of a lateral edge of the preset polygonal prism;

selecting one or more of the normal direction of each face of the preset polygonal prism, the normal direction of each face of the convex body, and the vector products as multiple testing axes;

for each of the multiple testing axes,
  projecting the cylindrical collider onto the testing axis according to the location of the preset polygonal prism in the local coordinate system of the convex body;
  when the projections of the preset polygonal prism and the convex body intersect with each other on each testing axis:
    determining that there is a collision between the cylindrical collider and the convex body; and
    moving the cylindrical collider away from the convex body in the real-time virtual scenario to avoid the collision.

16. The non-transitory computer readable storage medium according to claim 15, wherein the preset polygonal prism is a substitute of the cylindrical collider.

17. The non-transitory computer readable storage medium according to claim 16, wherein the operation of determining a location of the preset polygonal prism in the local coordinate system of the convex body further comprises:

transforming an X axis, a Y axis, a Z axis, and midpoints of the preset polygonal prism into the local coordinate system of the convex body, to obtain vectors corresponding to unit vectors of the X axis, the Y axis, and the Z axis of the preset polygonal prism in the local coordinate system of the convex body;

multiplying the vector of the Z axis in the local coordinate system of the convex body by positive and negative half height values of the cylindrical collider, to obtain midpoint coordinates on the upper and the lower bottom faces of the polygonal prism;

obtaining a radius of the cylindrical collider, obtain, according to the vectors corresponding to the radius, the X axis, the Y axis of the cylindrical collider in the local coordinate system of the convex body, offsets of vertexes of the preset polygonal prism relative to the midpoints of the faces which they are located;

obtaining sums of the offsets and the midpoint coordinates to obtain coordinates of the corresponding vertexes; and reconstructing the preset polygonal prism in the local coordinate system of the convex body according to coordinates of each vertex.

18. The non-transitory computer readable storage medium according to claim 16, wherein the plurality of operations further comprise:

projecting each vertex of the preset polygonal prism in the local coordinate system of the convex body; and setting extreme values to obtain a difference, so as to obtain a projection length of the cylindrical collider.

19. The non-transitory computer readable storage medium according to claim 16, wherein the plurality of operations further comprise:

obtaining a radius and a half height of the cylindrical collider, coordinate base vectors corresponding to base vectors of three axes, namely, X, Y, and Z axes of the cylindrical collider in the local coordinate system of the convex body, and a testing axis direction of each testing axis in the local coordinate system of the convex body to calculate a projection length of the cylindrical collider.

20. The non-transitory computer readable storage medium according to claim 15, wherein the preset polygon prism is a regular polygon inscribed to the bottom face of the cylindrical collider.

* * * * *